United States Patent [19]

McGee

[11] Patent Number: 4,843,602
[45] Date of Patent: Jun. 27, 1989

[54] APPARATUS PROVIDING EXTENDED RANGE OF PROPORTIONAL CONTROL OF THE RADIAL EXCURSION OF A WRITE/READ LIGHT SPOT ON THE TRACKS OF A DISC-SHAPED RECORD CARRIER

[75] Inventor: Philip J. L. McGee, Eindhoven, Netherlands

[73] Assignee: U. S. Philips Corporation, New York, N.Y.

[21] Appl. No.: 34,968

[22] Filed: Apr. 6, 1987

[30] Foreign Application Priority Data

Nov. 17, 1986 [NL] Netherlands .................... 8602911

[51] Int. Cl.[4] .................................................. G11B 7/00
[52] U.S. Cl. ............................................................ 369/44
[58] Field of Search ...................................... 369/43–46, 369/109, 50, 32; 358/342; 250/201 DF; 360/77, 78

[56] References Cited

U.S. PATENT DOCUMENTS

4,359,635 11/1982 Gross .............................. 358/342 X
4,446,545 5/1984 Van Dijk .............................. 369/44
4,530,079 7/1985 Millar .................................... 369/44
4,703,468 10/1987 Baba et al. ............................ 369/44

Primary Examiner—Robert L. Richardson
Attorney, Agent, or Firm—Algy Tamoshunas

[57] ABSTRACT

An apparatus for writing and/or reading information in substantially concentric tracks on a disc-shaped record carrier. The tracks are scanned by a beam of radiation focussed into a light spot thereon, and detection means responsive to the light reflected from the tracks generates a radial error signal which varies substantially proportionally to the radial excursion of the light spot relative to a track over a control range of p/4, p being the track pitch. The detection means comprises an error signal correction circuit for deriving from such signal a control signal ($S_1$) having a substantially proportional control range for excursions of the light spot up to a value exceeding p/2 from a track. The control signal is supplied to radial positioning means, and controls the radial position of the light spot on a track. Proportional radial positioning is achieved even for excursions of the light spot up to a maximum of 3p/4 from a track, the light being returned to the correct track even after such an excursion. Such positioning control is highly immune to mechanical shocks.

10 Claims, 6 Drawing Sheets

APPARATUS PROVIDING EXTENDED RANGE OF PROPORTIONAL CONTROL OF THE RADIAL EXCURSION OF A WRITE/READ LIGHT SPOT ON THE TRACKS OF A DISC-SHAPED RECORD CARRIER

BACKGROUND OF THE INVENTION

1. Field of the Invention

The invention relates to an apparatus for writing and/or reading information in substantially concentric tracks on a disc-shaped record carrier, which apparatus comprises:

a light source for generating a light beam, an objective lens system for focussing the light beam to form a light spot on the record carrier, first detection means which are responsive to the track structure to generate a first control signal which varies substantially proportionally to the radial displacement of the light spot relative to said track over a control range of p/4 to either side of the track, p being the track pitch, and radial positioning means for controlling the radial position of the light spot on a track under the control of said first control signal.

2. Description of the Related Art

Such an apparatus is known from the published British Patent Application No. 2,073,452.

It is to be noted that such apparatus is suitable for different uses. The best-known uses are those where disc-shaped record carriers containing a non-erasable program can be read by means of an optical read unit. For this reference is made to the Compact Disc Digital Audio System (CD audio) and derivatives of this system, such as CD-ROM (for data storage) and CD-I (for interactive purposes).

However, the apparatus may also be used in systems enabling information to be both recorded in and read from a disc-shaped record carrier. Examples of such systems are systems in which information can be inscribed in a metal layer by locally evaporating this metal layer by means of a light beam, systems in which a crystalline material is converted into an amorphous material or vice versa by means of a light beam, and magneto-optical systems.

In systems with a write capability it is essential that the blank record carrier already be provided with a control track, for example in the form of a real or imaginary track structure. An example of this is a prestructured track in the form of a pregroove. An example of an imaginary control track structure is a track which is defined by pits (servobytes) which are situated at regular distances in the longitudinal direction of the track and which are slightly shifted relative to this track in a radial direction. Radial position control of the light spot during recording is then effected by means of such control track.

During reading of information reading radial control can be achieved by utilising the tracks which contain the recorded information.

The apparatus known from said British Patent Application is found to be sensitive to mechanical shocks, which may sometimes give rise to loss of track. Loss of track means that during recording or reading the light spot has moved off the track so far that the information can no longer be recorded or read correctly.

SUMMARY OF THE INVENTION

It is the object of the invention to provide optical read/record apparatus which is less sensitive to mechanical shocks. To this end the apparatus is characterized in that the first detection means comprise correction means for extending the substantially proportional control range to a value larger than p/4.

The invention is based on the recognition of the following fact. The apparatus known from the abovementioned British Patent Application comprises first detection means which derive a first control signal in the form of a radial error signal. This radial error signal varies sinusoidally as a function of the radial excursion of the light spot relative to the track, the period of such sinusoidal radial error signal being equal to the period of the track pitch (i.e. the radial displacement of the track in one revolution of the record carrier). The zero crossings of the radial error signal are situated at the location of the track and at a distance equal to half the track pitch (viewed in the radial direction) from the track. This means that the radial error signal can be used as a proportional control signal for the radial positioning means only for excursions of the light spot relative to the track which are smaller than a quarter of the track pitch. Excursions of the light spot relative to the track in a range between a quarter and three quarters of the track pitch correspond to the unstable operating range of the control system, so that the radial positioning means tend to position the light spot on an adjacent track, which is of course undesirable. However, a correct tracking control is also required for excursions of the light spot between a quarter and three quarter of the track pitch. In the known apparatus this is achieved as follows.

If, for example, as a result of shocks, the light spot moves away from a track, in such a way that the excursion of the light spot relative to the track lies between a quarter and three quarters of the track pitch, a second control signal (referred to as the "track-loss" signal) is generated which disables the normal radial tracking, after which the radial positioning means are actuated pulsewise to move the light spot back towards the track. When the light spot reaches a position which is situated at a distance smaller than a quarter track pitch from the track, the normal (proportional) control is again rendered operative and the radial positioning means position the light spot onto the track. However, as a result of such pulsewise energisation the light spot may overshoot the track and again enter a range of excursions between a quarter and three quarters of the track pitch, but now on the other side of the track. Again the second control signal ("track-loss" signal) is generated, but it is again uncertain whether in response to the pulsewise energisation the light spot will be moved to a position within the control range of the normal (proportional) control for the radial positioning means. When in accordance with the invention the proportional control range of the radial positioning means is extended, so that the light spot can also be returned to the track in the case of excursions larger than a quarter of the track pitch, a control system is obtained which is less sensitive to mechanical shocks. Moreover, this results in a positioning control with a larger lock-in range for "track search". "Track search" occurs for example if a mechanical shock is such that the light spot jumps over a number of tracks. The apparatus is capable of counting this number of tracks and the radial control is capable of returning the light spot over that number of tracks and positioning the spot on the original track.

Moreover, in accordance with the invention, in; the radial positioning means of the known apparatus the first control signal is differentiated for an improved control. In fact, it is the velocity information (of the light spot movement) which is then fed back, which is far more effective than feedback of the position information. This modification in accordance with the invention also provides a correct feedback (i.e. with the correct sign) of the velocity information in a range of excursions larger than p/4, which leads to an additional damping of the movement of the light spot in this range.

The proportional control may be extended to cover excursions larger than p/2, i.e. half a track pitch. This has the advantage that, if the excursion of the light spot is larger than a quarter track pitch, the radial positioning means will control the light spot towards the same track by means of the proportional control system. If the excursion of the light spot is larger than half the track pitch, the proportional control will tend to direct the light spot towards the adjacent track. However, extending the proportional control to allow for excursions larger than half the track pitch can be achieved by using the first detection means to derive a proportional first control signal for excursions relative to the track up to the maximum of three quarters of the track pitch. This results in an even better control which is even more immune to mechanical shocks.

In apparatus in accordance with the invention the first detection means are adapted to derive the radial error signal as a function of the excursion of the light spot relative to the track in a radial direction, which radial error signal has a periodic variation determined by the track structure in the case of an excursion of the light spot over a plurality of tracks in a radial direction. The correction means are adapted to derive the first control signal from the radial error signal, the first control signal $S_1$ satisfying the equation $$S_1 = c.RE$$

for excursions of the light spot smaller than or equal to p/4 and satisfying the equation $$S_1 = a.RE_{max} - b.RE$$

for excursions of the light spot larger than p/4, where $RE$ is the value of the radial error signal for an excursion r in a specific direction of the track, $RE_{max}$ is the value, including the sign, of the radial error signal for an excursion p/4 in the same direction, and a, b and c are constants which comply with $a - b \geq c$. In this way it is achieved that both for excursions of the light spot in one radial direction, i.e. towards the centre of the record carrier and for excursions in an opposite direction, i.e. towards the circumference of the record carrier, a satisfactory radial tracking can be obtained over a wide range, if desired up to excursions of maximum ¾ of the track pitch.

Preferably, $a \geq 2$ and $b = a - c$. This yields a first control signal which as a function of the excursion exhibits a continuous curvature without steps at the location of p/4. The value b in fact determines the slope of the curve in the range between p/4 and (suitably) 3p/4. The curve becomes steeper and the radial positioning means provide a better control to return the light spot to the track as (a and) b increase(s).

If a=2 and b=1 the correction means can be realised very simply. For excursions larger than p/4 in a specific direction relative to the track the correction means provide mirror-inversion of the radial error signal about the value which the radial error signal has in the case of an excursion of the light spot equal to p/4 in the same direction.

The apparatus, which moreover comprises second detection means for deriving a second control signal (the "track-loss" signal) which indicates whether or not the light spot is positioned more or less on a track, may be characterized further in that the correction means comprise a signal-combination unit and a sample-and-hold circuit. The input of the correction means is coupled to a first input of the signal-combination unit and via the sample-and-hold circuit to a second input of the signal-combination unit, which signal-combination unit has an output coupled to an output of the correction means. An output of the second detection means is coupled to a control-signal input of the sample-and-hold circuit, which sample-and-hold circuit is adapted to hold or not to hold the signal applied to an input under the influence of the second control signal. The signal-combination unit may be adapted to amplify the signal applied to its second input by a gain factor a and to amplify the signal applied to its first input by a gain factor b, and to subtract the signal amplified by the gain factor a from the signal amplified by the gain factor b. The sample-and-hold circuit holds the signal applied to its input if the second detection means supply a second control signal which indicates that the light spot is not positioned on a track.

The signal-combination unit can be realised in various manners. A first possibility is that it comprises an amplifier stage and a subtractor circuit, the first input of the signal-combination unit is coupled to a first input of the subtractor circuit, the second input of the signal-combination unit is coupled to a second input of the subtractor circuit via tha amplifier stage, which subtractor circuit has an output coupled to the output of the signal-combination unit. A further possibility is that the signal-combination unit comprises a differential amplifier, the first input of the signal-combination unit is coupled to the inverting input of the differential amplifier via a first impedance, the second input of the signal-combination unit is coupled to the non-inverting input of the differential amplifier, which has an output coupled to the output of the signal-combination unit and, via a second impedance, to the inverting input of the differential amplifier. These are two possibilities by means of which radial tracking can be realised by means of a proportional control for excursions up to a maximum of ¾ of the track pitch. Moreover, if the impedance values of the two impedances are equal, the last-mentioned possibility provides an apparatus where the gain factors a and b are equal to 2 and 1 respectively.

In the foregoing reference is made to "tracks on the record carrier". In this respect it is to be noted that in the case of record carriers such as Compact Discs and Laservision Discs the record carriers contain only one track which extends over the record carrier along spiral path. In fact "track" is to be understood to mean that portion of the spiral track on the record carrier which is scanned during one revolution of the record carrier.

BRIEF DESCRIPTION OF THE DRAWINGS

Embodiments of the invention will now be described in more detail, by way of example, with reference to the drawings. Elements in different Figures bearing the same reference numerals are identical. In the drawings FIG. 3a shows two adjacent tracks and FIGS. 3b and 3c respectively show the second and the first control signal as a function of the position of the light spot relative to the tracks.

DESCRIPTION OF THE PREFERRED EMBODIMENTS

Figure 1:
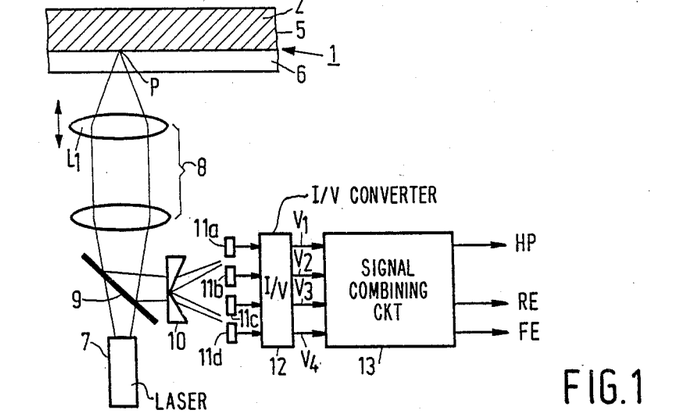
FIG. 1 shows a part of the apparatus in accordance with the invention.

FIG. 1 shows a first part of an apparatus in accordance with the invention. The apparatus is an apparatus for reading information from the record carrier 1. FIG. 1 shows schematically a sectional view of a disc-shaped record carrier 1. This record carrier comprises a substrate 2 with a track structure in the form of pits and non-pits (not shown). The sectional view is taken at the location of and in the longitudinal direction of a track. The relief structure of tracks is covered with a reflecting layer 5 and a transparent protective coating 6. The information contained in the relief structure of tracks is read in that a laser beam generated by a laser 7 is projected and focussed to form a read spot P on the track via an objective system 8, the reflected beam being projected on a linear array of four optical detectors 11a, 11b, 11c and 11d by means of a semitransparent mirror 9 and a beam splitter 10. The currents supplied by these photo-detectors are converted into the signal voltages $V_1$, $V_2$, $V_3$ and $V_4$ by means of a current-voltage converter 12.

In order to ensure a correct reading the objective system 8 is focussed by moving the lens L1 of the objective system 8 in the upward and downward direction, as is indicated by the arrow. This movement is controlled by means of a focus control signal FE. In the apparatus known from the afore-mentioned British Patent Application No. 2,073,452 the target area of the laser beam in the radial direction is controlled for the purpose of radial tracking under command of a radial control signal or radial error signal RE. This control is achieved (in a manner not shown) by moving the entire optical system 7, 8, 9, 10, 11 in a radial direction under command of the control signal RE. By means of FIGS. 4, 5 and 8 to be described hereinafter it will be illustrated that in the apparatus in accordance with the invention the first control signal is derived from the radial error signal by correction means 48, 48' and 48", which first control signal controls the radial positioning means 47.

The control signals RE and FE are derived from the signal voltages $V_1$, $V_2$, $V_3$ and $V_4$. The sum $V_1+V_2+V_3+V_4$ is required for deriving the high-frequency data signal HF, the signal $(V_1+V_4)-(V_2+V_3)$ is required for deriving the signal FE, and the signal $(V_1+V_2)-(V_3+V_4)$ is required for deriving the signal RE. These signals are derived in the signal combining circuit shown in block form bearing the reference numeral 13.

So far, the description corresponds to that in Philips Technical Review, Vol. 40, 1982, no. 6, pp. 153-154. The other parts of three embodiments of the apparatus in accordance with the invention will be described hereinafter with reference to FIGS. 4, 5 and 8.

Figure 2A:
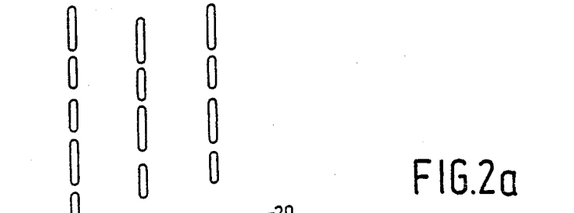
FIG. 2a shows three adjacent tracks on a record carrier.
Figure 2B:
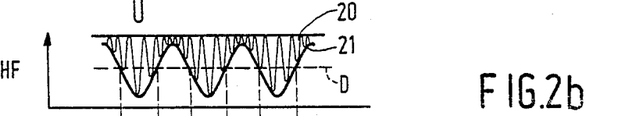
FIGS. 2b to 2d illustrate the variation of some signals as a function of the position of the light spot relative to the tracks.
Figure 2C:
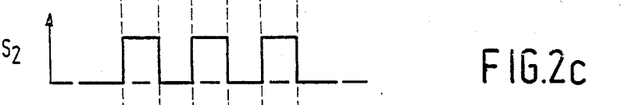
Figure 2D:
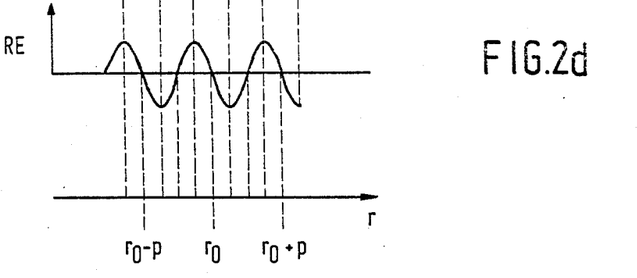

FIGS. 2a-2d illustrate the behaviour of the high-frequency data signal HF and of the radial error signal RE as a function of the radial displacement of the objective system and hence of the light spot relative to the track. FIG. 2a shows three adjacent tracks together forming the track which extends over the record carrier along a spiral path. FIG. 2b shows the high-frequency data signal HF 20, whose envelope bears the reference numeral 21. The amount of reflected light is maximal for the areas between the tracks. The envelope has then the highest amplitude. This means that the modulation depth is then minimal. Exactly on the tracks the amount of reflected light is minimal. This means that the envelope has the lowest amplitude. The modulation depth is then maximal. By comparing the envelope signal 21 with a (variable) threshold D it is possible to derive a second control signal $S_2$, see FIG. 2c, which is high when the envelope 21 is smaller than the threshold D and which is low if the envelope is larger than the threshold D. Comparing FIG. 2a with FIG. 2c shows clearly that the signal $S_2$ indicates whether the light spot is situated more or less on the track. FIG. 2d shows the radial error signal RE. This signal becomes positive if the light spot moves away from the track to the left and become negative if the light spot moves away from the track to the right. If the light spot moves away from the track to the left or the right, the radial positioning means in the known apparatus will move the objective system to the right or the left respectively under the influence of the signal RE, to return the light spot to the track. Moreover, it is evident from FIG. 2d that for radial excursions of the light spot relative to the track equal to a maximum of a quarter of the track pitch p, radial tracking for returning the light spot to the track is effected by control proportional to the radial distance of the light spot from the track. For excursions larger than the quarter of the track pitch and smaller than three quarters of the track pitch the control is no longer proportional. If the light spot comes within this range, for example as a result of mechanical shocks, this may result in the light spot being controlled towards the adjacent track. In order to preclude this, the radial tracking is disabled in the range $r_0+p/4<r<r_0+3p/4$ and in the range $r_0-3p/4<r<r_0-p/4$, for example by means of the second control signal. Subsequently, it is attempted by means of the pulsewise energisation already described to bring the light spot back into the range $r_0-p/4<r<r_0+p/4$, so that the (proportional)

radial positioning control can be rendered operative again.

Figure 3A:
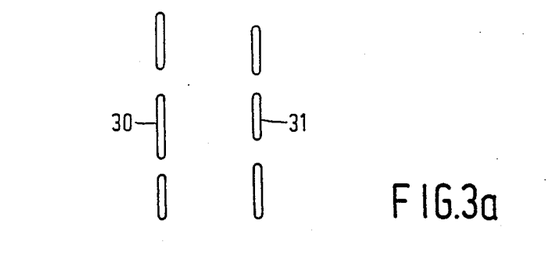
Figures 3B, 3C:
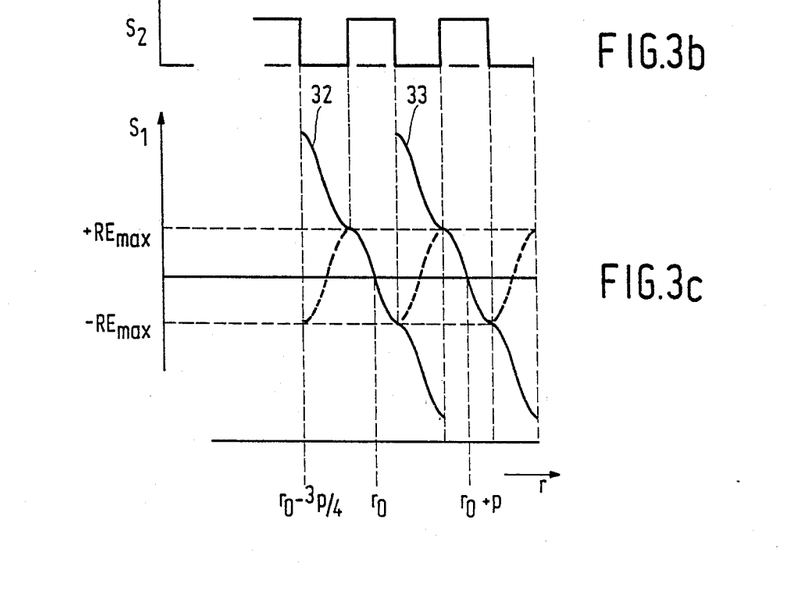

In accordance with the invention the proportional control range for radial tracking is extended in such a way that also for excursions of the light spot larger than p/4 the radial tracking is capable of returning the light spot to the track. For example, the control range may be extended to the midpoint between the tracks. FIGS. 3a–3c show a radial positioning control having a control range up to 3p/4 towards either side of a track.

FIG. 3a again shows two adjacent tracks, FIG. 3b again shows the second control signal $S_2$, and FIG. 3c shows the first control signal $S_1$. The first control signal $S_1$ is applied to the radial positioning unit (47, see FIGS. 4 and 5) to provide radial tracking over a control range up to a maximum of 3p/4 towards either side of the track. The first control signal $S_1$ is derived from the radial error signal RE in FIG. 2d, the second control signal $S_2$ (the "track-loss" signal) being utilised for so deriving the first control signal $S_1$. For controlling the radial position of the light spot relative to the track 30 in FIG. 3a the associated first control signal is represented by the curve 32, see FIG. 3c. For controlling the radial position of the light spot relative to the track 31 the associated first control signal is represented by the curve 33, see also FIG. 3c. For excursions of the light spot relative to the track 30 which are smaller than or equal to p/4, the curve 32 of first control signal $S_1$ corresponds to the radial error signal RE. For excursions larger than p/4 and smaller than (or equal to) 3p/4 the first control signal $S_1$ is obtained by mirror-inverting the radial error signal RE about the value of the radial error signal for an excursion p/4. For an excursion of the light spot to the left relative to the track 30 this means a mirror-inversion about the value of the radial error signal corresponding to $r = r_0 - p/4$. This corresponds to a mirror-inversion about the value $RE_{max}$. For an excursion to the right this means a mirror-inversion about the value of the radial error signal corresponding to $r = r_0 + p/4$. This means a mirror-inversion about the value $-RE_{max}$. The broken line in FIG. 3c represents the normal variation of the radial error signal RE. The curve 33 for the radial tracking near the track 31 is obtained in the same way. This means that for small excursions of the light spot relative to the track 31 which are smaller than or equal to p/4, the curve 33 corresponds to the radial error signal RE. For excursions larger than p/4 and smaller than (or equal to) 3p/4 the first control signal is obtained by a mirror-inversion about the value $RE_{max}$ (in the case of an excursion to the left of the track 31) or about the value $-RE_{max}$ (in the case of an excursion to the right of the track 31). From FIG. 3c it is evident that over a control range up to 3p/4 off a track, the first control signal $S_1$ has a value which varies substantially proportionally to the radial distance of the light spot from the relevant track. The radial tracking now operates as follows.

Assume that the light spot is situated on the track 30. As a result of mechanical shocks the light spot moves off the track 30 to the left or to the right. The excursion of the light spot is found to be larger than p/4 and smaller than 3p/4. This means that at a given instant during the movement away from the track 30 the position $r = r_0 - p/4$ or $r_0 + p/4$ is passed. At this instant the value $RE_{max}$ or $-RE_{max}$ (for a movement to the left or to the right of the track respectively) is stored, so that for excursions larger than p/4 the radial error signal RE of FIG. 2d may be mirror-inverted. Consequently, the light spot is returned to the track 30 under the influence of the first control signal $S_1$, in the form of the curve 32, which first control signal is therefore applied to the radial positioning means 47 (see FIGS. 4, 5 and 8).

Now it is assumed that the mechanical shocks are such that the light spot has an excursion to the right relative to the track 30 between $r_0 + 3p/4$ and $r_0 + p$. The radial control will then direct the light spot towards the track 31 in conformity with the curve 33.

If the light spot is already situated on the track 31 the radial control, in a manner as described in the foregoing, will direct the light spot back to the track 31 under the influence of the first control signal in conformity with the curve 33 in the case of excursions up to a maximum of 3p/4 to the left or the right of the track 31. If the light spot has an excursion with a magnitude between 3p/4 and p to the left of the track 31 the light spot will be controlled towards the track 30 in conformity with the curve 32.

Figure 4:
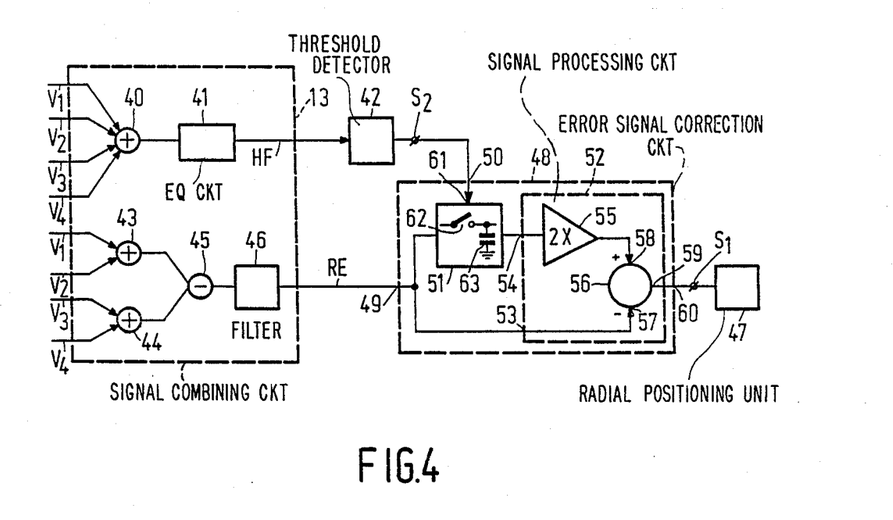
FIG. 4 shows the correction circuit of a first embodiment.

FIG. 4 shows schematically the correction circuit of a first embodiment of the apparatus in accordance with the invention. Starting from the signals $V_1$ to $V_4$, see also FIG. 1, after addition in the signal adding unit 40 and further processing in circuit 41, in which inter alia equalisation is effected, the high-frequency data signal HF is obtained which is applied to the envelope threshold detector circuit 42. This circuit detects the envelope 21 of the high-frequency data signal HF and compares it with the threshold D, see FIG. 2b. The circuit 42 subsequently supplies the second control signal $S_2$, i.e. the track-loss signal, as its output signal. Moreover, the radial error signal RE is derived starting from the signals $V_1$ to $V_4$, after addition in the signal-adding units 43 and 44, subtraction in the signal-subtraction unit 45 and further processing in 46, in which low-pass filtering is effected. The elements 43 to 46 form part of the first detection means, producing first control signal $S_1$. The first control signal $S_1$ is derived from the radial error signal RE and is applied to the radial positioning unit 47. The radial positioning unit 47 comprises a control device (not shown), for example in the form of an actuator, for positioning the optical system 7, 8, 9, 10, 11, see FIG. 1. The first control signal $S_1$ is derived from the radial error signal RE with the aid of first detection means which form part of the correction circuit 48. For this purpose an input 49 of the correction circuit 48 receives the radial error signal RE. Moreover, a control signal input 50 of circuit 48 is coupled to an output of the threshold detector 42, for receiving the control signal $S_2$. The elements 40, 41 and 42 constitute the second detection means for deriving the second control signal $S_2$.

The correction circuit 48 comprises a sample-and-hold circuit 51 and a signal-processing circuit 52. The input 49 of circuit 48 is coupled to a first input 53 of the processing circuit 52 and, via the sample-and-hold circuit 51, to a second input 54 of the processing circuit 52. The processing unit 52 is adapted to multiply the signal applied to its second input 54 by a factor of 2 and to subtract therefrom the signal applied to its first input 53. For this purpose the processing circuit 52 comprises an amplifier stage 55 and a subtractor circuit 56. The input 53 to the processing circuit 52 is coupled to a first input 57 of the subtractor circuit 56. Input 54 is coupled to a second input 58 of the subtractor circuit 56 via the amplifier stage 55 which has a gain factor of 2. The output 59 of the subtractor circuit 56 is coupled to the output of the processing circuit 52, which moreover constitutes the output 60 of the complete correction circuit 48. Further, the control signal input 50 is coupled to the control signal input 61 of the sample-and-hold circuit 51. In this circuit 51 the switch 62 is closed if the control signal $S_2$ is high, see FIG. 3b. This means that the switch 62 is closed for excursions of the light spot relative to the track smaller than or equal to p/4. Then a control signal $S_1$ identical to the radial error signal RE appears on the output 60 of the correction unit 48. At the instant at which the light spot passes the position $r = r_0 - p/4$ ($r_0 + p/4$) the signal $S_2$ goes low, causing the switch 62 to be opened. The capacitor 63, which forms part of the circuit 51, now stores the signal $RE_{max}$ (or $-RE_{max}$). If the excursion of the light spot is directed to the left, the signal $S_1$ on the output 60 becomes equal to $2.RE_{max}-RE$ for excursions between p/4 and 3p/4. If the excursion of the light spot is directed to the right, the signal $S_1$ on the output 60 becomes $-2.RE_{max}-RE$ for excursions between p/4 and 3p/4. Thus the complete curve 32 of FIG. 3c is realised. It is obvious that the curve 33 is obtained in a similar manner.

If the light spot has an even larger excursion to the left or to the right of the track, the switch 62 is closed again at the instant at which the position $r = r_0 + 3p/4$ is reached. For excursions between 3p/4 and p the signal $S_1$ on the output 60 consequently becomes equal to RE. This means that for excursions of maximum 3p/4 relative to the track 30 in FIG. 3a the light spot is again returned to the track 30. If the excursion (to the right) becomes larger than 3p/4, the light spot is directed towards the track 31.

Figure 5:
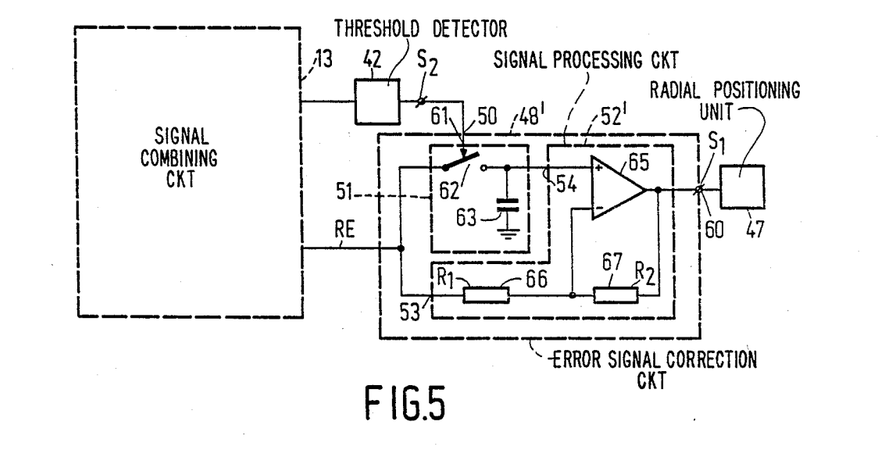
FIG. 5 shows the correction circuit of a second embodiment of the apparatus in accordance with the invention.

FIG. 5 shows another embodiment of the correction circuit. The signal processing circuit 52' is now constituted by a differential amplifier 65. The first input 53 of the processing circuit 52' is coupled to the inverting input (−) of the differential amplifier 65 via a first impedance 66 in the form of the resistor having a resistance value $R_1$. The second input 54 is coupled to the non-inverting input (+) of the amplifier 65. The output of the amplifier 65 constitutes the output 60 of the correction circuit 48' and is, moreover, coupled to the inverting input of the amplifier 65 via a second impedance 67 in the form of a resistor having a resistance value $R_2$. The circuit 48' in FIG. 5 operates in the same way as the circuit 48 in FIG. 4 if $R_1$ is equal to $R_2$.

In general, the correction circuit can derive the first control signal $S_1$ from the radial error signal in the following manner. Within the control range for excursions of the light spot smaller than or equal to p/4 the following equation is valid $$S_1 = c.RE$$

and in the control range for excursions between p/4 and 3p/4 the following equation is valid $$S_1 = a.RE_{max} - b.RE$$

where $RE_{max}$ is the value (including the sign) of the radial error signal for an excursion p/4 in the same direction as the actual excursion of the light spot, and where a, b, and c are constants which comply with $a - b \geq c$.

Figures 6A, 6B:
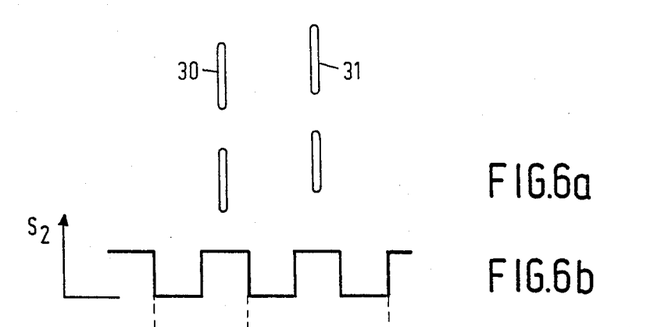
FIG. 6a shows two adjacent tracks.
FIG. 6b shows the second control signal and FIG. 6c shows another first control signal.
Figure 6C:
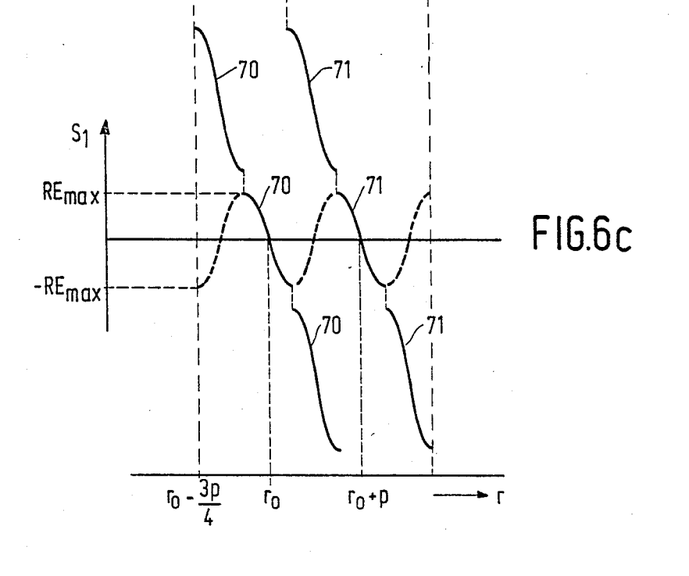

FIG. 6a shows the two tracks 30 and 31 and FIG. 6b shows the second control signal $S_2$. FIG. 6c shows the first control signal $S_1$ in the case that $c = 1$ and $a - b > c$. For radial excursions relative to the track 30 the control signal will be in conformity with the curve 70. For radial excursions relative to the track 31 the control signal will be as represented by the curve 71.

The curves 70 and 71 exhibit the discontinuities. For the curve 70 these discontinuities are situated at the positions $r = r_0 - p/4$ and $r = r_0 + p/4$. It is also evident that over the entire control range for radial excursions up to a maximum of 3p/4 from a track the curve 70 (and 71) has value which varies proportionally to the radial distance of the light spot from this track.

Figure 7A:
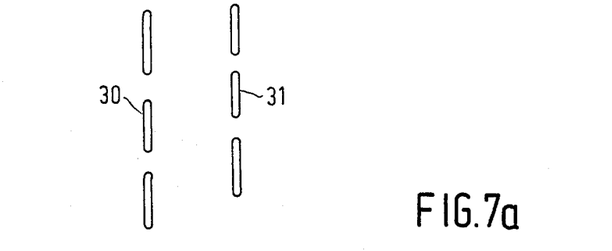
FIG. 7a shows two adjacent tracks.
Figure 7B:
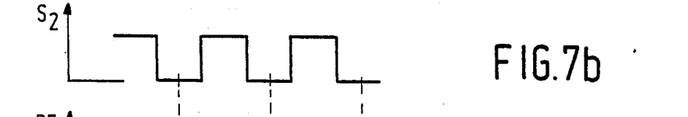
FIG. 7b shows the second control signal.
Figure 7C:
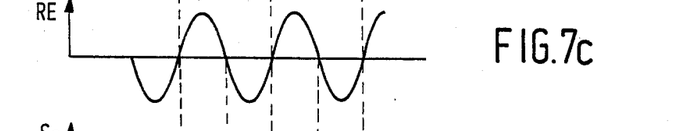
FIG. 7c shows the radial error signal.
Figures 7D, 7E:
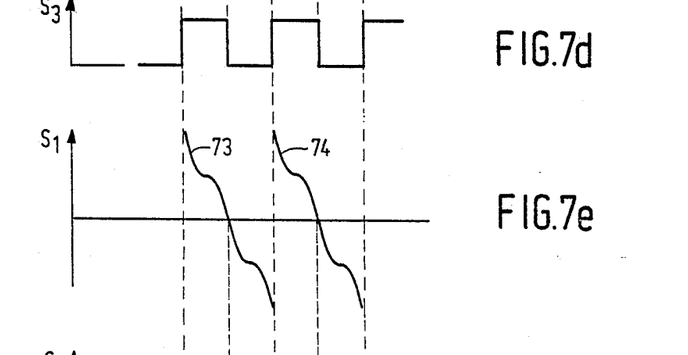
FIG. 7d shows a third control signal.
FIG. 7e shows yet another first control signal.

FIG. 7e shows a first control signal which in a range up to a maximum radial excursion of p/2 from a track has a value which is substantially proportional to the radial excursion of the light spot from this track. In the range within p/4 from a track the first control signal again corresponds to the radial error signal RE. In the range of excursions between p/4 and p/2 relative to a track the first control signal $S_1$ is obtained by mirror-inverting such error signal about the value of the radial signal for $r = p/4$ in the same direction as the excursion of the light spot. This results in the curves 73 and 74 in FIG. 7e. Within the range p/2 these curves correspond to the curves 32 and 33 of FIG. 3c.

Figure 8:
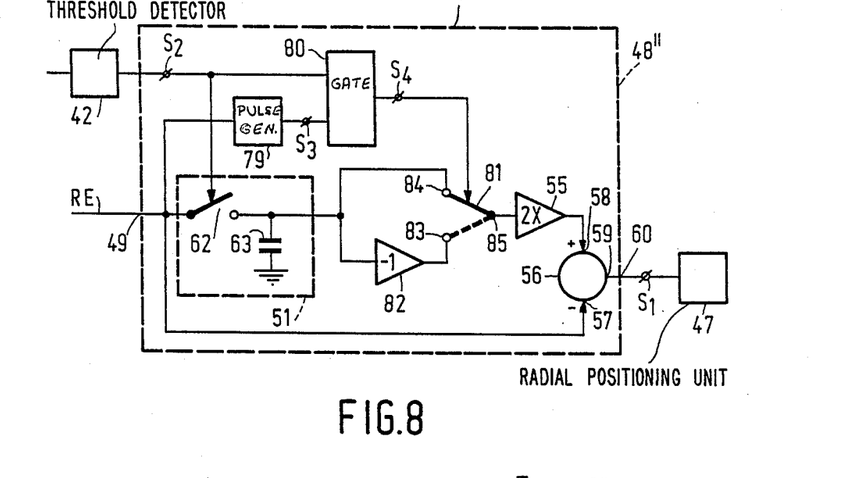
FIG. 8 shows an example of a correction circuit for deriving the control signal of FIG. 7e.

FIG. 8 shows a correction circuit 48'' by means of which the control signal $S_1$ of FIG. 7e can be obtained. The correction circuit 48'' of FIG. 8 resembles to the correction circuit 48 of FIG. 4. The correction circuit 48'' further comprises a unit 79 which generates a pulse signal $S_3$ starting from the signal RE, see FIG. 7d. The signal $S_3$ goes high when RE is positive and low when RE is negative, see also FIG. 7c. The signal $S_3$ and the signal $S_2$ are applied to a gate unit 80 which derives a control signal $S_4$ for controlling the position of a switch 81 from the two signals. Further, the output of the sample-and-hold circuit 51 is coupled to one terminal 83 of the switch 81 via an inverting amplifier 82. The output of the sample-and-hold circuit is also coupled directly to a second terminal 84 of the switch 81, whose output terminal 85 is coupled to the input of the amplifier stage 55.

If the signal $S_4$ is low, the switch 81 is in the upper position. If the signal $S_4$ is high, the switch 81 is in the lower position.

Figure 7F:
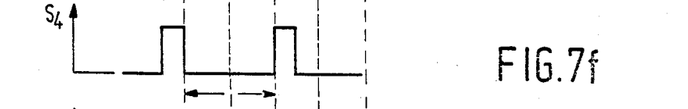
FIGS. 7f and 7g show a fourth control signal.
Figure 7G:
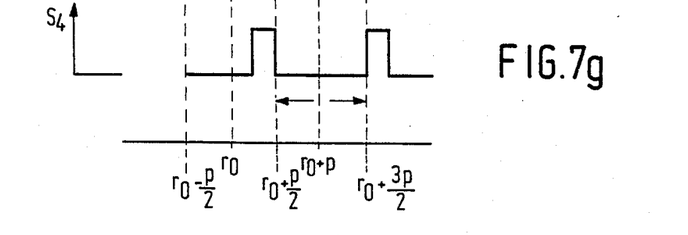
Figure 9:
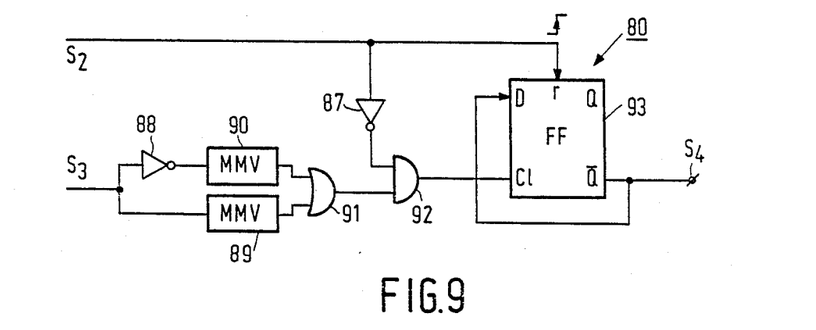
FIG. 9 shows an example of the gate unit in the correction circuit shown in FIG. 8.

FIG. 7f illustrates the signal $S_4$ for a movement of the light spot away from the track 30 and FIG. 7g illustrates the control signal $S_4$ in the case of a movement of the light spot away from the track 31. FIG. 9 shows an example of the gate circuit 80. The signal $S_2$ is applied to an inverter 87 and to a reset input r of a flip-flop 93. The output of the inverter 87 is coupled to an input of an AND gate 92. The signal $S_3$ is applied directly to a monostable multivibrator 89 and via an inverter 88 to a monostable multivibrator 90. The outputs of these multivibrators 89 and 90 are coupled to a second input of the AND gate 92 via an OR gate 91, the output of the AND gate 92 being coupled to the clock input c1 of the flip-flop 93. The $\overline{Q}$ output of the flip-flop 93 supplies a signal $S_4$. The circuit operates as follows.

If the light spot is situated substantially on a track, i.e. if $S_2$ is high, the output of the inverter 87 is low and inhibits the AND gate 92. The $\overline{Q}$ output of the flip-flop 93 is then low, see FIGS. 7b, 7f and 7g. If the light spot is situated on the track 30 and moves to the right of the track, the signal $S_2$ will go low at the instant $r = r_0 + p/4$. This means that the switch 62 is opened. The AND gate 92 is no longer inhibited. Since the flip-flop 93 is reset only after a rising edge on the reset input r, the signal $S_4$ will not change. It remains low. Should the light spot return to the track 30 before point $r=r_0+p/2$ is reached, the signal $S_4$ will remain low. The reset pulse has no effect at the instant at which the point $r=r_0+p/4$ is passed, because the Q output of the flip-flop 93 is already high. However, the switch 62 is closed.

If the light spot moves further to the right and point $r=r_0+p/2$ is passed, a pulse is applied to the clock input c1 of the flip-flop 93 via the monostable multivibrator 89 (it is assumed that the multivibrators 89 and 90 supply a pulse when a rising edge appears on their inputs), the OR gate 91, and the AND gate 92. The signal appearing on the D input is transferred to the Q output. Consequently, $S_4$ goes high. This means that the switch 81 in FIG. 8 is set to the lower position. This implies that a change-over is effected to the curve 74, see FIGS. 7e and 7f. Now the light spot is controlled towards the track 31. If the light spot passes point $r=r_0+3p/4$ the rising edge in the signal $S_2$ ensures that the flip-flop 93 is reset. Thus, the signal $S_4$ goes low again. The switch 81 is again in the upper position. Moreover, the switch 62 is closed again at this instant, so that control towards the track 31 still proceeds in conformity with the curve 74, see FIG. 7e.

If the light spot is situated on the track 31 only the switch 62 will open, see FIG. 7g in the case of a movement to the left at the instant at which the position $r=r_0+3p/4$ is passed. At the instant at which the position $r=r_0+p/2$ is passed a pulse will be applied to the clock input c1 of the flip-flop 93 via the inverter 88, the multivibrator 90, the OR gate 91 and the AND gate 92 as a result of the falling edge in the signal $S_3$, causing $S_4$ to go high. The switch 81 assumes the lower position. If subsequently the light spot passes the position $r=r_0+p/4$, the flip-flop is reset by the signal $S_2$. The signal $S_4$ goes low again, see FIG. 7g.

When the curves of FIG. 7e are compared with those of FIG. 3c, it will be evident that in both cases the proportional control is extended to handle excursions larger than p/4 relative to the track. Moreover, the curves of FIG. 3c provide a much stronger control towards the track than the curves of FIG. 7e. This is because the control of FIG. 3c has a much larger range, namely up to excursions of 3p/4 relative to track and because the control signal of FIG. 3c reaches a substantially larger value for similar gain factors. This means that the control of FIG. 3c is far more immune to mechanical shocks and therefore returns the light spot to the same track in more cases. It is to be noted that the scope of the invention is not limited to the embodiments shown. The invention also relates to those embodiments which differ from the embodiments shown in respect of points which are irrelevant to the invention. For example, the embodiments described relate to apparatuses for reading information from a track. However, the invention is also applicable to apparatuses for recording information in a track. In that case, as already stated, a control track must be provided, which is read by the apparatus to derive the necessary control signals, such as the radial error signal and the first and the second control signal. Moreover, the optical detection means may generate more than one light spot, which additional light spots may then be used for determining the radial position of the write or read spot.

What is claimed is:

1. An apparatus for writing and/or reading information in substantially concentric tracks on a disc-shaped record carrier, which apparatus comprises:
    a light source for generating a light beam;
    an objective system for focusing the light beam to form a light spot on the record carrier;
    means for scanning said light spot across said tracks so as to produce a reflected beam therefrom having an intensity corresponding to the radial excursion of the light spot relative to a track;
    first detection means responsive to the reflected beam to generate a radial error signal which varies substantially proportionally to the radial excursion of the light spot relative to a track over a control range of p/4 to either side of such track, p being the track pitch; and
    radial positioning means for controlling the radial position of the light spot on a track;
    characterized in that said first detection means comprises an error signal correction circuit for deriving from said error signal a first control signal which is the same as said error signal for excursions of said light spot up to p/4 from a track, and which is a mirror-inverted replica of said error signal for excursions of said light spot exceeding p/4 from a track; said correction circuit having an output supplying said first control signal to said radial positioning means to control the radial position of said light spot on a track in accordance with such signal.

2. An apparatus as claimed in claim 1, characterized in that said error signal correction circuit extends the substantially proportional control range of said first control signal for excursions of said light spot up to 3p/4 from a track.

3. An apparatus as claimed in claim 1 or 2, in which the radial error signal produced by said first detection means has a periodic variation determined by the pitch of said tracks when the light spot scans across said tracks; characterized in that said error signal correction circuit derives said first control signal $S_1$ from said radial error signal in accordance with the equation $$S_1 = c.RE$$

for excursions of the light spot less than or equal to p/4, and in accordance with the equation $$S_1 = a.RE_{max} - b.RE$$

for excursions of the light spot exceeding p/4, where
    RE is the value of the radial error signal corresponding to a given radial excursion in one direction from a track,
    $RE_{max}$ is the value (including the sign) of the radial error signal for a radial excursion of p/4 in such direction, and
    a, b, and c are constants which comply with $a - b \geq c$.

4. An apparatus as claimed in claim 3, characterized in that $a \geq 2$ and in that $b = a - c$.

5. An apparatus as claimed in claim 4, characterized in that $a = 2$, and $b = 1$.

6. An apparatus as claimed in claim 3, further comprising second detection means for deriving a second control signal which indicates whether the light spot is positioned mostly on a track; characterized in that said correction circuit comprises a signal-processing circuit and a sample-and-hold circuit; an input of said correction circuit being coupled to a first input of the signal-processing circuit at which said radial error signal is received from said first detection means and being further coupled to an input of the sample-and-hold circuit; an output of the sample-and-hold circuit being coupled to a second input of the signal-processing circuit; said signal-processing circuit having an output which constitutes an output of said correction circuit; an output of the second detection means being coupled to a control-signal input of the sample-and-hold circuit, the sample-and-hold circuit being controlled by said second control signal whether to hold the radial error signal received at the input thereof from said first detection means.

7. An apparatus as claimed in claim 6, characterized in that the signal-processing circuit is adapted to amplify the signal applied to its second input by a gain factor (a) and to amplify the signal applied to its first input by a gain factor (b), and to subtract the amplified signal at its first input from the amplified signal at its second input; the sample-and-hold circuit being adapted to hold the signal applied to its input when the second detection means supplies a second control signal which indicates that the light spot is not mostly positioned on a track.

8. An apparatus as claimed in claim 7, characterized in that the signal-processing circuit comprises an amplifier and a subtractor circuit; the first input of the signal-processing circuit being coupled to a first input of the subtractor circuit; the second input of the signal-processing circuit being coupled to a second input of the subtractor circuit via said amplifier; said subtractor circuit having an output coupled to the output of the signal-processing circuit.

9. An apparatus as claimed in claim 7, characterized in that the signal-processing circuit comprises a differential amplifier; the first input of the signal-processing circuit being coupled to an inverting input of the differential amplifier by a first impedance; the second input of the signal-processing circuit being coupled to a non-inverting input of the differential amplifier; the differential amplifier having an output coupled to the output of the signal processing circuit and being further coupled by a second impedance to the first impedance.

10. An apparatus as claimed in claim 9, wherein $a=2$, and $b=1$ and further characterized in that said first and second impedances are equal to each other.

* * * * *